(12) United States Patent
Agrawal et al.

(10) Patent No.: US 12,499,198 B2
(45) Date of Patent: Dec. 16, 2025

(54) DYNAMICALLY ENABLING EMERGENCY ACCESSIBILITY ON TOUCH FAILURE DETECTION

(71) Applicant: MOTOROLA MOBILITY LLC, Wilmington, DE (US)

(72) Inventors: Amit Kumar Agrawal, Bangalore (IN); Jyothsna Bandameedipalli, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 314 days.

(21) Appl. No.: 18/299,382

(22) Filed: Apr. 12, 2023

(65) Prior Publication Data

US 2024/0346121 A1    Oct. 17, 2024

(51) Int. Cl.
| | |
|---|---|
| G06F 21/32 | (2013.01) |
| G06F 3/041 | (2006.01) |
| G06F 3/04886 | (2022.01) |
| G06V 40/16 | (2022.01) |
| G10L 17/24 | (2013.01) |

(52) U.S. Cl.
CPC ............ *G06F 21/32* (2013.01); *G06F 3/0412* (2013.01); *G06F 3/04886* (2013.01); *G06V 40/172* (2022.01); *G10L 17/24* (2013.01)

(58) Field of Classification Search
CPC .... G06F 21/32; G06F 3/0412; G06F 3/04886; G06V 40/172; G10L 17/24
See application file for complete search history.

(56) References Cited

U.S. PATENT DOCUMENTS

| | | | | |
|---|---|---|---|---|
| 2010/0114573 | A1* | 5/2010 | Huang | G10L 17/24 |
| | | | | 704/250 |
| 2016/0299616 | A1* | 10/2016 | Crowther | G06F 1/1626 |
| 2019/0272831 | A1* | 9/2019 | Kajarekar | G10L 17/06 |
| 2022/0164421 | A1* | 5/2022 | Gruhlke | H04L 63/08 |

* cited by examiner

*Primary Examiner* — James J Yang
(74) *Attorney, Agent, or Firm* — Isidore PLLC (57) ABSTRACT

An electronic device, method, and computer program product respond to the electronic device having an inoperable touch screen display by enabling emergency authentication of and access by a user by activating secondary authentication input options and data transfer features A controller of the electronic device monitors the touch screen display for operability. In response to determining at least a portion of the touch screen display is inoperable for one or more of presenting a user interface and detecting a touch input of a touch screen access credential, the controller accesses emergency access credential(s) stored in memory of the electronic device. The controller activates an emergency access mode and initiates monitoring input device(s) for an input of emergency access credential(s). In response to authenticating a user based on detecting the emergency access credential(s), the controller enables one or more detectable input commands to control the electronic device.

20 Claims, 7 Drawing Sheets

DYNAMICALLY ENABLING EMERGENCY ACCESSIBILITY ON TOUCH FAILURE DETECTION

BACKGROUND

1. Technical Field

The present disclosure relates generally to communication devices having a user interface device, and in particular to communication devices that have a touch screen user interface device that presents user logon access.

2. Description of the Related Art

User communication devices may be sized for mobility, enabling users to engage in audio as well as video communication sessions in nearly any location. Within a small handheld form factor, communication devices present sensors and output devices that can be used as a traditional phone handset with a speaker positioned to be used as an earpiece and a microphone positioned to capture audio inputs as spoken by a user. Some communication devices such as smartphones have become multi-functional devices as the designs have increasingly incorporated a large number of capabilities. In an example, rather than being limited to manually actuated control keys and buttons, touch screen displays are configurable to present visual content and graphical controls in support of many types of applications, in addition to supporting user communication sessions. Additionally, the communication devices provide access to user accounts and contain sensitive personal data/information that requires safeguarding. As one security feature, touch screen displays can be configured to lock to prevent unauthorized users from accessing the communication device in order to protect sensitive personal information. Often, having an operable touch screen display is essential to operate the communication device.

As an exposed component of a mobile device that is meant to be carried around and held by users and thus frequently dropped, the touch screen displays are susceptible to being damaged when the mobile device is dropped. All or most of the ability to display content or to receive touch inputs may be lost when the touch screen display is cracked or shattered. When access to the device functionality requires the touch screen be operable, situations arise with a badly damaged touchscreen where the user is unable to gain access to the device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, an electronic device, a method, and a computer program product respond to the electronic device having an inoperable touch screen display by enabling emergency authentication of and access by a user by activating secondary authentication input options and data transfer features. In one or more embodiments, the electronic device includes a touch screen display, at least one input device, and a memory storing a touch screen access credential and at least one emergency access credential that does not involve a touch input at the touch screen display. A controller of the electronic device is communicatively connected to the touch screen display, the input device, and the memory. The controller monitors a touch screen of the touch screen display for operability. The controller determines that at least a portion of the touch screen display is inoperable for one or more of presenting a user interface and detecting a touch input. In response, the controller activates an emergency access mode and initiates monitoring the at least one input device for an input of the at least one emergency access credential. In response to authenticating a user based on detecting the at least one emergency access credential, the controller enables one or more detectable input commands (e.g., gesture and voice commands) to control the electronic device.

As an exposed component of a mobile device that is meant to be carried around and held by users and thus frequently dropped, the touch screen displays are susceptible to being damaged when the mobile device is dropped. All or most of the ability to display content or to receive touch inputs may be lost when the touch screen display is cracked or shattered. When access to the device functionality requires the touch screen be operable, situations arise with a badly damaged touchscreen where the user is unable to gain access to the device.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
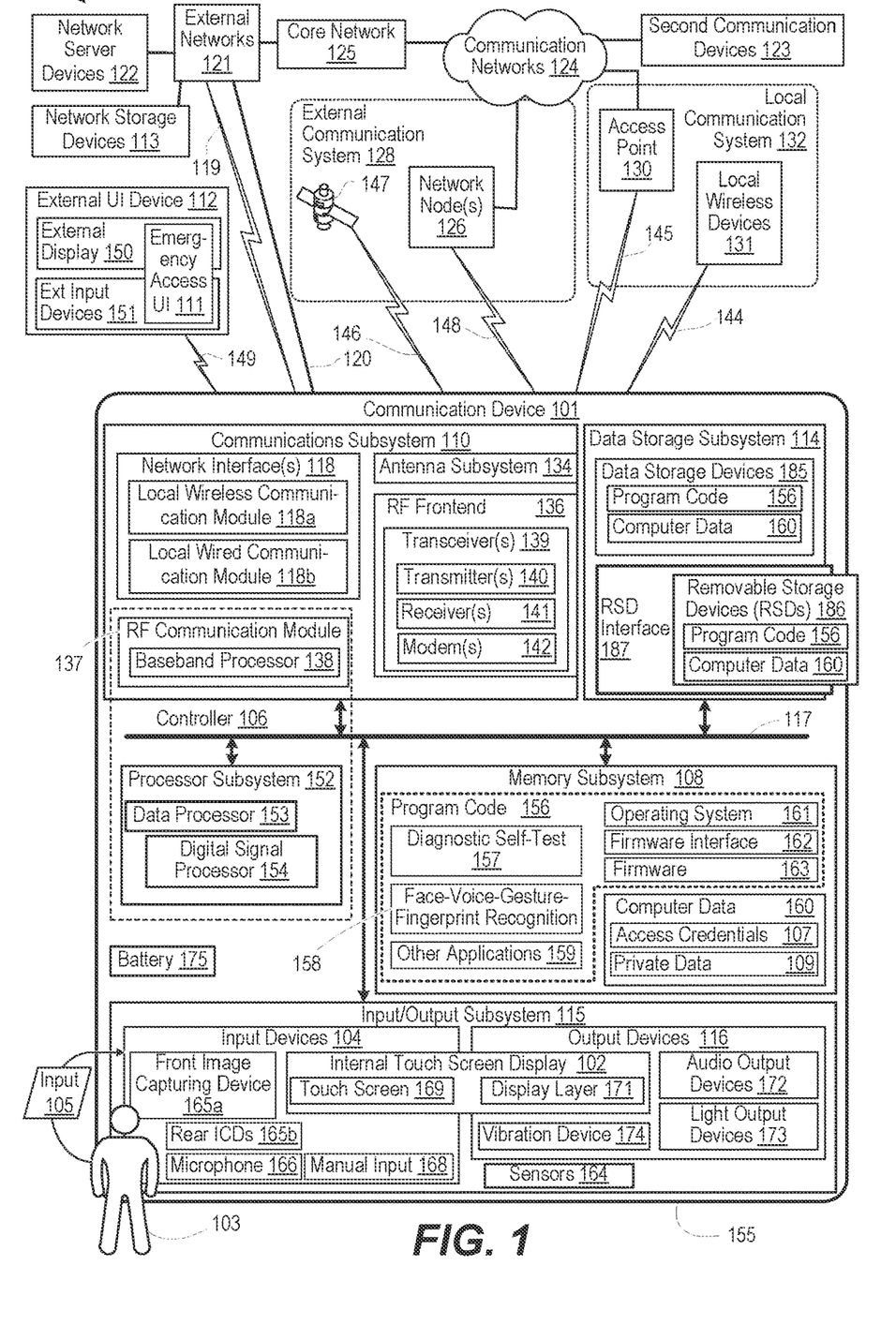
FIG. 1 depicts a functional block diagram of a communication environment including a communication device that detects failure of an internal touch screen device and responds by enabling alternative user authentication and control for data security, according to one or more embodiments.

FIG. 1 is a functional block diagram of a communication environment 100 that includes an electronic device, which is referenced herein as communication device 101 and in which the features of the present disclosure are advantageously implemented. Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

According to aspects of the disclosure, communication device 101 detects failure of internal touch screen display 102 that prevents normal (i.e., via touch-screen) login access to the device by user 103 who is a primary user of communication device 101. Communication device 101 responds by enabling at least one input device 104 as an alternative way to normal authentication, to detect/receive input 105 (e.g., face, voice, fingerprint, gesture, answer of private information) from user 103 for authenticated emergency access to and control of the communication device 101. For emergency authentication, controller 106 of communication device 101 uses access credentials 107 stored in memory subsystem 108 of communication device 101. Access credentials 107 may be considered as emergency access credentials, in that they are not used as normal access credentials. In an example, user 103 may not configure communication device 101 with always- on voice for normal operations due to privacy concerns, but communication device can allow for voice recognition (i.e., by turning on always-on voice) for emergency access when the failure of the internal touch screen display 102 is detected. Alternatively, emergency authentication enables entry of normal access credentials as emergency access credentials in an emergency manner that is different from a normal manner. In an example, voice entry of a private answer may be substituted for touch entry of the private answer. With user 103 authenticated, communication device 101 enables access and control (e.g., backup or deletion for data security) for private data 109 stored in memory subsystem 108. Alternatively or in addition, controller 106 may use communications subsystem 110 of communication device 101 to provide emergency access user interface (UI) 111 on external user interface device 112 or to backup private data 109 on network storage device 113.

Referring now to the specific component makeup and the associated functionality of the presented components. In addition to controller 106, memory subsystem 108, and communications subsystem 110, communication device 101 includes data storage subsystem 114, and input/output (I/O) subsystem 115 having input devices 104 and output devices 116. To enable management by controller 106, system interlink 117 communicatively connects controller 106 with memory subsystem 108, communications subsystem 110, data storage subsystem 114, and I/O subsystem 115. System interlink 117 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 117) are illustrated in FIG. 1, it is to be understood that more, fewer, or different interconnections may be present in other embodiments.

In one or more embodiments, communications subsystem 110 may include one or more network interfaces 118, such as local wireless communication module 118a and local wired communication module 118b, to communicatively couple communication device 101 respectively via wireless connection 119 or network cable 120 to external networks 121. Communication device 101, via external networks 121, may connect to network storage devices 113 that store computer data and to network server devices 122 that facilitate access to network storage devices 113. Network server devices 122 may have identical or similar components and functionality as described above for communication device 101. Communication device 101 may communicate with second communication devices 123 via external networks 121 or via communication networks 124 that are supported by core networks 125. Network interface(s) 118 may include a network interface controller (NIC) and support one or more network communication protocols. External networks 121 can include a local area network (LAN), a campus area network (CAN), a metropolitan area network (MAN), or a wide area network (WAN). For example, wireless connection 119 and network cable 120 can be an Ethernet connection/cable.

In one or more embodiments, communications subsystem 110 may include additional functionality for communicating, using a cellular connection, with network node(s) 126 of external communication system 128 and for communicating, using a wireless connection, with wireless access point 130 or local wireless devices 131 of local communication system 132. Communications subsystem 110 includes antenna subsystem 134. Communications subsystem 110 includes radio frequency (RF) front end 136 and RF communication module 137 having baseband processor 138. RF front end 136 includes transceiver(s) 139, which includes transmitter(s) 140 and receiver(s) 141. RF front end 136 further includes modem(s) 142. Baseband processor 138 of RF communication module 137 communicates with controller 106 and RF front end 136. Baseband processor 138 operates in a baseband frequency range to encode data for transmission and decode received data, according to a communication protocol. Modem(s) 142 modulates baseband encoded data from RF communication module 137 onto a carrier signal to provide a transmit signal that is amplified by transmitter(s) 140. Modem(s) 142 demodulates each signal received using antenna subsystem 134 from external communication system 128 or local communication system 132. The received signal is amplified and filtered by receiver(s) 141, which demodulates received encoded data from a received carrier signal.

In one or more embodiments, controller 106, via communications subsystem 110. performs multiple types of cellular over-the-air (OTA) or wireless communication with local communication system 132. Communications subsystem 110 can communicate via an OTA connection 144 with local wireless devices 131. In an example, OTA connection 144 is a Bluetooth connection, or other personal access network (PAN) connection. In one or more embodiments, communications subsystem 110 communicates with one or more locally networked devices via a wireless local area network (WLAN) link 145 supported by access point 130. In one or more embodiments, access point 130 supports communication using one or more IEEE 802.11 WLAN protocols. Access point 130 is connected to communication networks 124 via a cellular or wired connection. In one or more embodiments, communications subsystem 110 receives downlink channels 146 from GPS satellites 147 to obtain geospatial location information. Communications subsystem 110 can communicate via an over-the-air (OTA) cellular connection 148 with network node(s) 126. Communication device 101 communicatively connects to external user interface device 112, such as a laptop, tablet computer, or desktop workstation, via connection 149. Connection 149 may include any of the previously mentioned wired, wireless, or RF connections or channels including other electromagnetic bands. External user interface device 112 includes at least one external display 150 and external input device(s) 151 that communication device 101 to support emergency access UI 111.

Controller 106 includes processor subsystem 152, which includes one or more central processing units (CPUs), depicted as data processor 153. Processor subsystem 152 can include one or more digital signal processors 154 that can be integrated with data processor 153. Processor subsystem 152 can include other processors that are communicatively coupled to data processor 153, such as baseband processors 138 of communication module 137. In one or more embodiments that are not depicted, controller 106 can further include distributed processing and control components that are external to housing 155 or grouped with other components, such as I/O subsystem 115. Data processor 153 is communicatively coupled, via system interlink 117, to memory subsystem 108. In one or more embodiments, data processor 153 is communicatively coupled via system interlink 117 to communications subsystem 110, data storage subsystem 114 and I/O subsystem 115. Controller 106 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

Memory subsystem 108 stores program code 156 for execution by processor subsystem 152 to provide the functionality described herein. Program code 156 includes applications such as diagnostic self-test application 157, face-voice-gesture recognition application 158 and other applications 159. In one or more embodiments, several of the described aspects of the present disclosure are provided via executable program code of applications executed by controller 106. Program code 156 may access, use, generate, modify, store, or communicate computer data 160, such as access credentials 107 and private data 109. Computer data 160 may incorporate "data" that originated as raw, real-world "analog" information that consists of basic facts and figures. Computer data 160 includes different forms of data, such as numerical data, images, coding, notes, and financial data. The computer data may originate at communication device 101 or be retrieved by communication device 101. Communication device 101 may store, modify, present, or transmit computer data 160. Computer data 160 may be organized in one of a number of different data structures.

Common examples of computer data 160 include video, graphics, text, and images as discussed herein. Computer data 160 can also be in other forms of flat files, databases, and other data structures.

In one or more embodiments, program code 156 may be integrated into a distinct chipset or hardware module as firmware that operates separately from executable program code. Portions of program code 156 may be incorporated into different hardware components that operate in a distributed or collaborative manner. Implementation of program code 156 may use any known mechanism or process for doing so using integrated hardware and/or software, as known by those skilled in the art. Memory subsystem 108 further includes operating system (OS) 161, firmware interface 162, such as basic input/output system (BIOS) or Uniform Extensible Firmware Interface (UEFI), and firmware 163, which may be considered to be program code 156.

I/O subsystem 115 includes input devices 104, output devices 116, and sensors 164. Input devices 104 may include front image capturing devices (ICDs) 165a, rear ICDs 165b, microphone 166, manual input devices 168 (e.g., keys and buttons), and touch screen 169 of internal touch screen display 102. Output devices 116 may include display layer 171 of internal touch screen display 102, audio output devices 172, light output devices 173, and vibration device 174 that oscillates a mass such as battery 175 to create vibratory alerts. Sensors 164 provides additional contextual indications of the use and environment of communication device 101. Examples of sensors 164 include location sensors, motion sensors or motion detectors such as accelerometers, grip sensors exteriorly presented on housing 155, ambient light sensor, and on-body or body proximity sensors that electromagnetically detects proximity to a lossy dielectric mass (i.e., body or hand of user 103).

Data storage subsystem 114 of communication device 101 includes data storage device(s) 185. Controller 106 is communicatively connected, via system interlink 117, to data storage device(s) 185. Data storage subsystem 114 provides program code 156 and computer data 160 stored on non-volatile storage that is accessible by controller 106. For example, data storage subsystem 114 can provide a selection of program code 156 and computer data 160. These applications can be loaded into memory subsystem 108 for execution/processing by controller 106. In one or more embodiments, data storage device(s) 185 can include hard disk drives (HDDs), optical disk drives, and/or solid-state drives (SSDs), etc. Data storage subsystem 114 of communication device 101 can include removable storage device(s) (RSD(s)) 186, which is received in RSD interface 187. Controller 106 is communicatively connected to RSD 186, via system interlink 117 and RSD interface 187. In one or more embodiments, RSD 186 is a non-transitory computer program product or computer readable storage device. Controller 106 can access data storage device(s) 185 or RSD 186 to provision communication device 101 with program code, such as program code 156.

Figure 2:
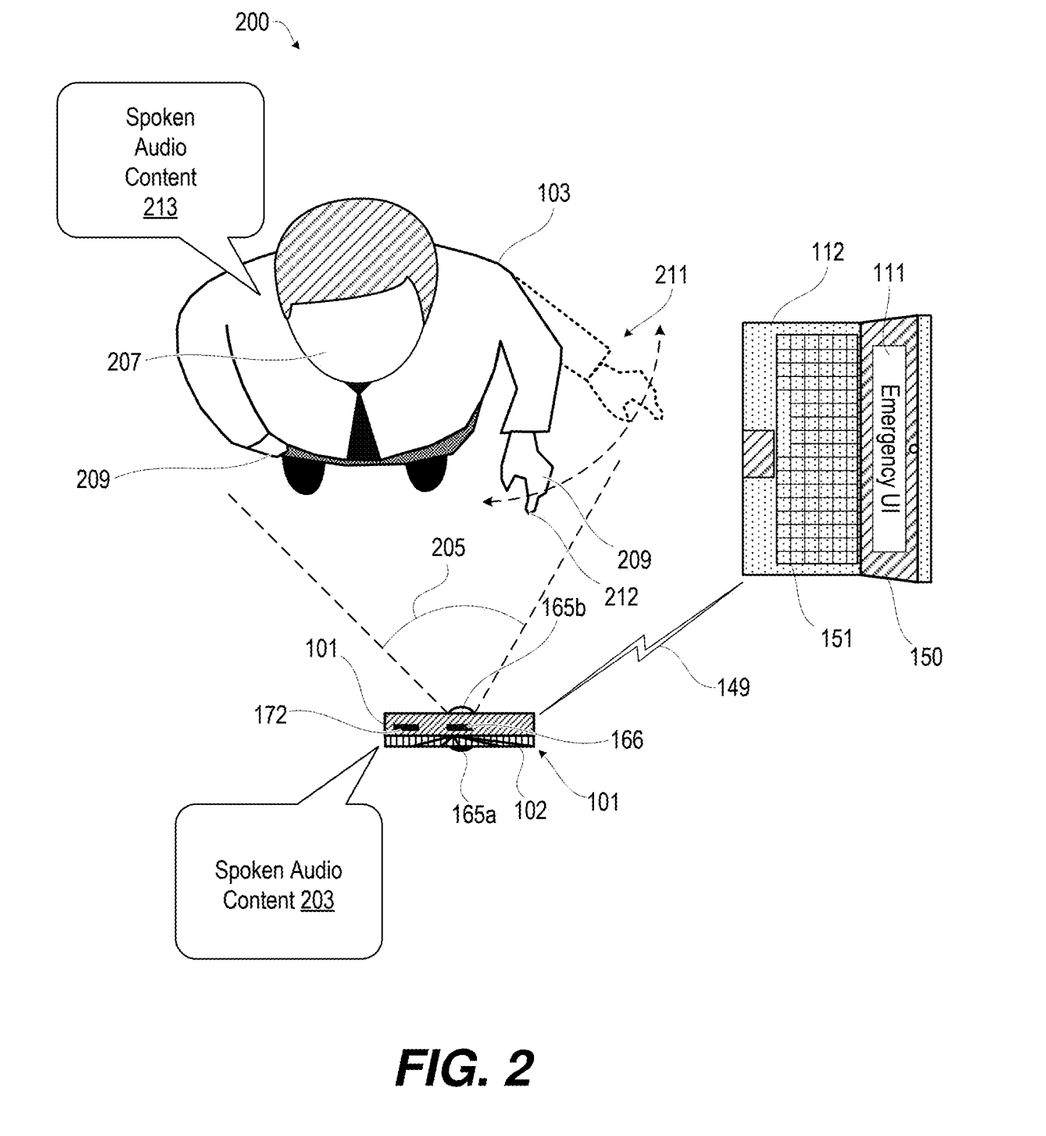
FIG. 2 is an aerial view of an environment including the communication device with a damaged display performing an emergency access procedure to authenticate a primary user and to support an emergency access user interface for data security, according to one or more embodiments.

FIG. 2 is an aerial view of environment 200 including communication device 101 with touch screen display that is damaged and inoperable for displaying output and/or receiving touch inputs. The damage to touch screen display is detectable by one or more sensors within the display and/or is identifiable by processor of communication device as the touch screen display being in a failed state. In response to detecting the failed state of the touch screen display, communication device 101 performs an emergency access procedure to enable authentication of user 103 as an authorized user of communication device 101. First, communication device 101 determines what input devices 104 and output devices 116 (FIG. 1) are operable to function as a local emergency user interface. In an example, front ICD 165a is damaged but rear ICD 165b is not and can thus be utilized to capture a facial image or fingerprint image or special gesture. Communication device 101 may present, at audio output device (or speaker) 172, audio spoken content 203 that includes instructions directing user 103 to position a field of view (FOV) 205 of rear ICD 165b to capture face 207 of user 103 for face recognition or to capture hands 209 of user 103 for pre-defined gestures 211 such as American sign language. Alternatively, or in addition, communication device 101 determines that rear ICD 165b has sufficient photographic capability to capture an image of finger 212 of user 103 with sufficient resolution for fingerprint recognition. Alternatively, or in addition, communication device 101 determines that microphone 166 is operable. Communication device 101 may present audio spoken content 203 that includes directing user 103 to provide spoken audio content 213 for voice recognition or for conveying a private answer used for authentication. Alternatively, or in addition, in response to authentication of user 103, communication device 101 can present, via connection 149, emergency access user interface 111 via external display 150 and external input devices 151 of external user interface device 112. Emergency access user interface 111 enables backup and/or erasure of private data 109 (FIG. 1) for purposes of data security. If communication device 101 is not already connected to external user interface device 112, communication device 101 may attempt to discover devices previously connected to communication device 101. Alternatively, or in addition, communication device 101 may discover other devices that are connectable to communication device 101 via a wired or wireless connection and seek verbal assistance from user 103 for permission to connect or for information necessary to connect. In one or more particular embodiments, the communication network that provides the wired or wireless connection includes at least one of a personal access network (PAN), a wireless local area network (WLAN), a radio access network (RAN), and a personal internet of things network (PIN).

Figure 3:
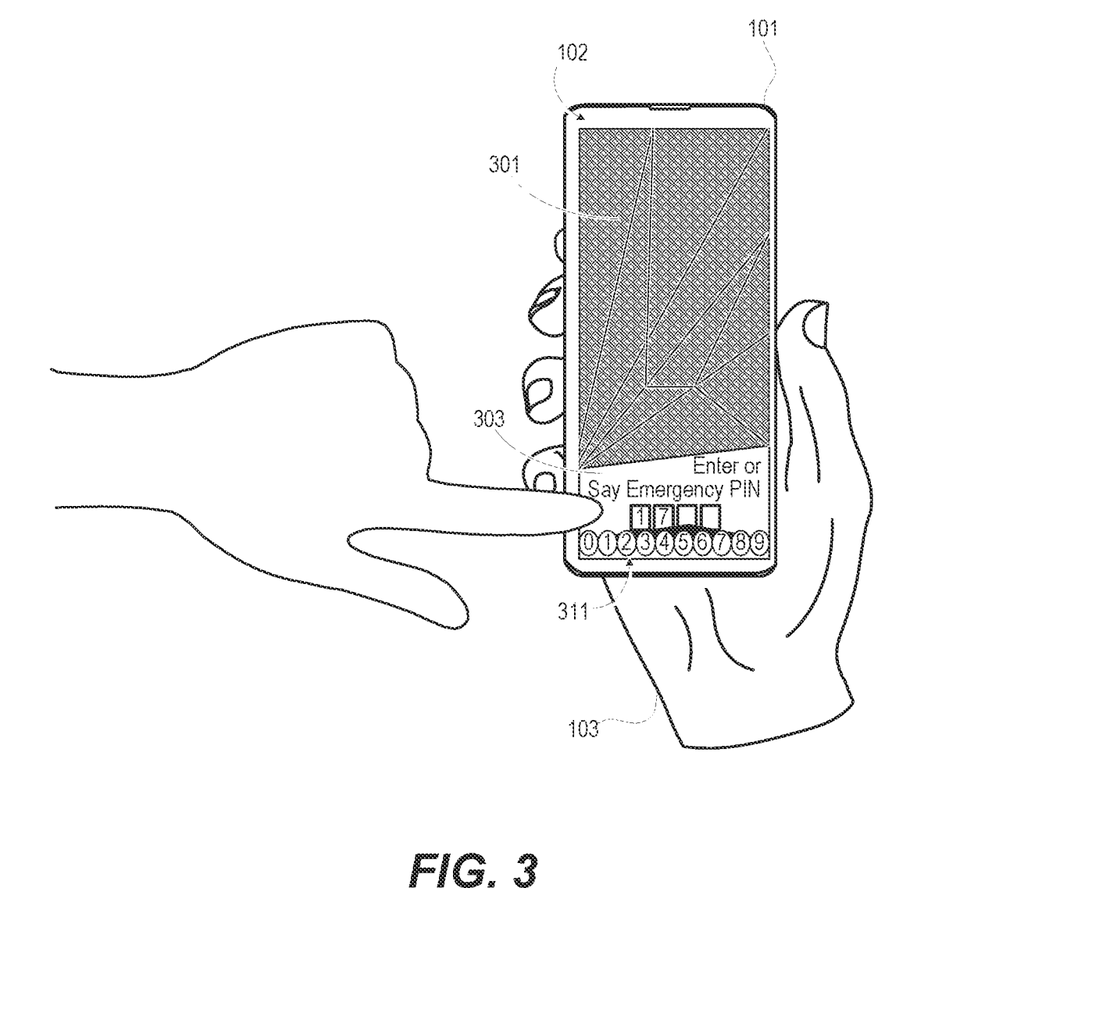
FIG. 3 is a front view of the communication device with a partially failed touch screen display being reconfigured for an emergency access user interface, according to one or more embodiments.

FIG. 3 is a front view of communication device 101 with touch screen display 102 having failed first portion 301 and operable second portion 303 for presenting display output and for receiving touch inputs. Communication device 101 renders emergency access user interface (UI) 311 sized for and positioned within second portion 303 of touch screen display 102. In an example, emergency access UI 311 enables entry of a character passcode or a numeric personal information number (PIN). In another example, emergency access UI 311 may present a question prompting a private answer from user 103. According to this embodiment, a normal position of the authentication access entry would be located under the area of the display that is damaged. The authentication access entry is then moved to the location at which operable second portion 303 exists.

Figure 4:
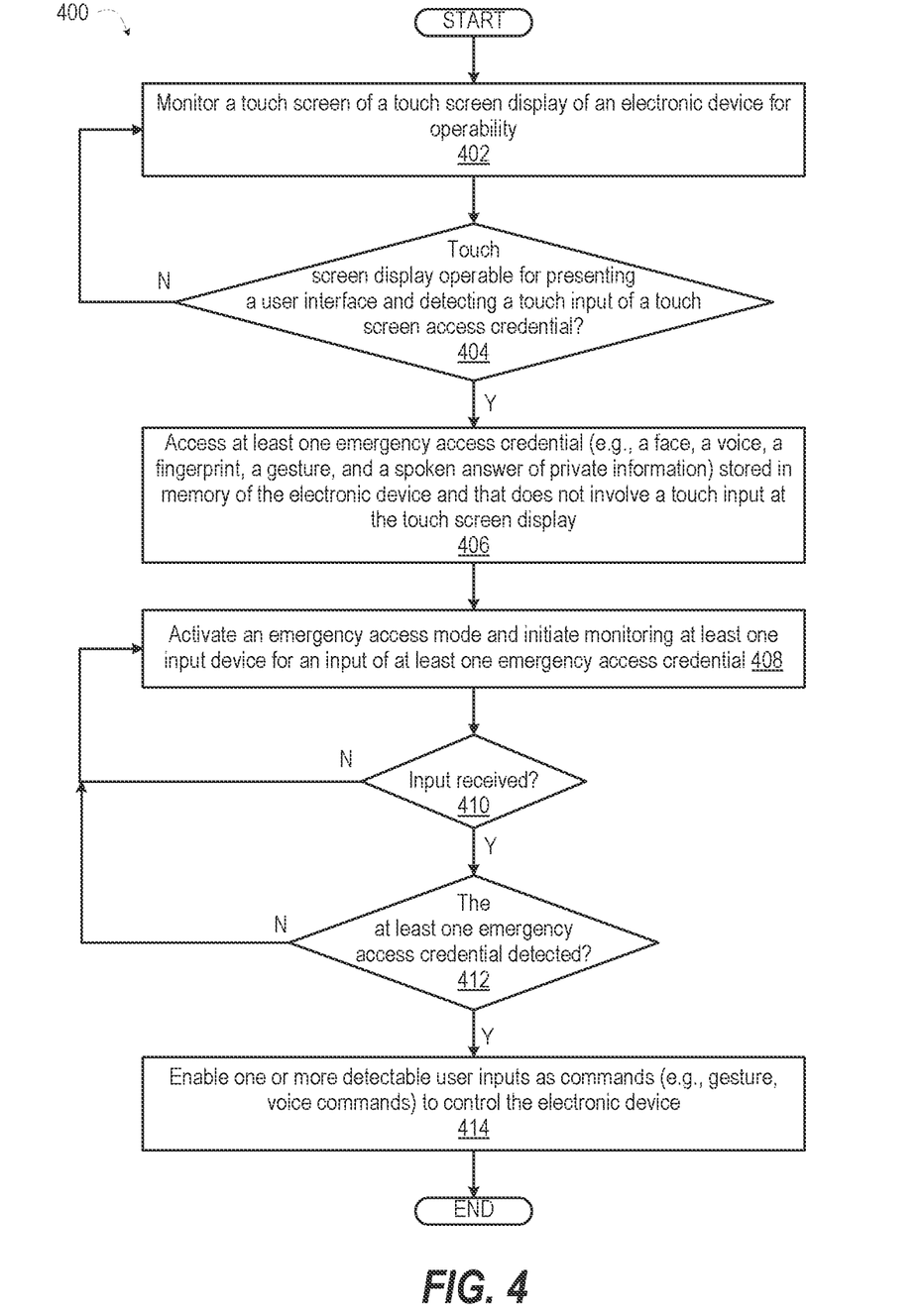
FIG. 4 is a flow diagram presenting a method of responding to the communication device having an inoperable touch screen display by enabling emergency authentication of and access by a user by activating secondary authentication input options and data transfer features, according to one or more embodiments.
Figure 5:
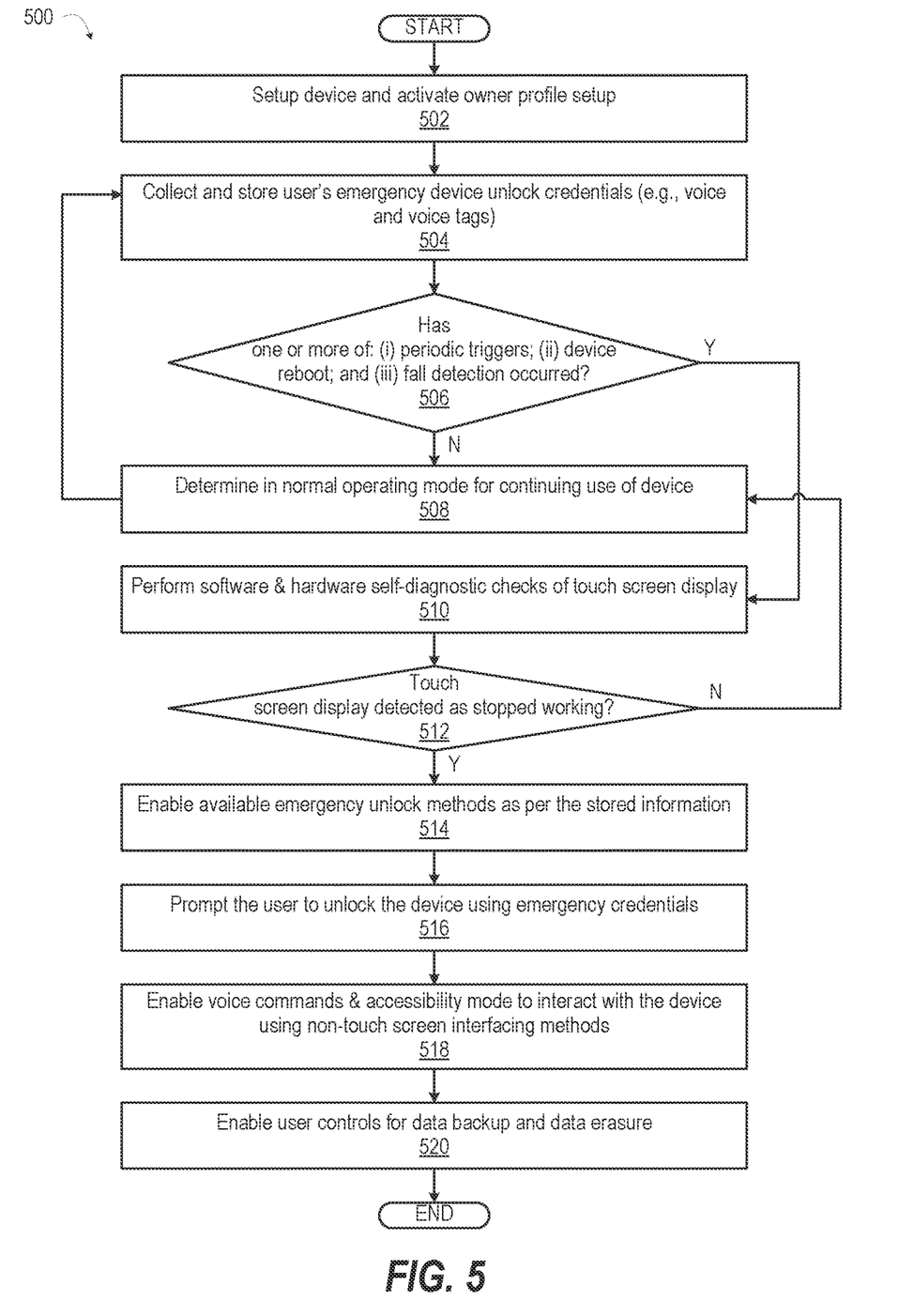
FIG. 5 is a flow diagram presenting another example method of responding to the electronic device having an inoperable touch screen display by enabling emergency authentication of and access by a user by activating secondary authentication input options and data transfer features, according to one or more embodiments.
Figure 6A:
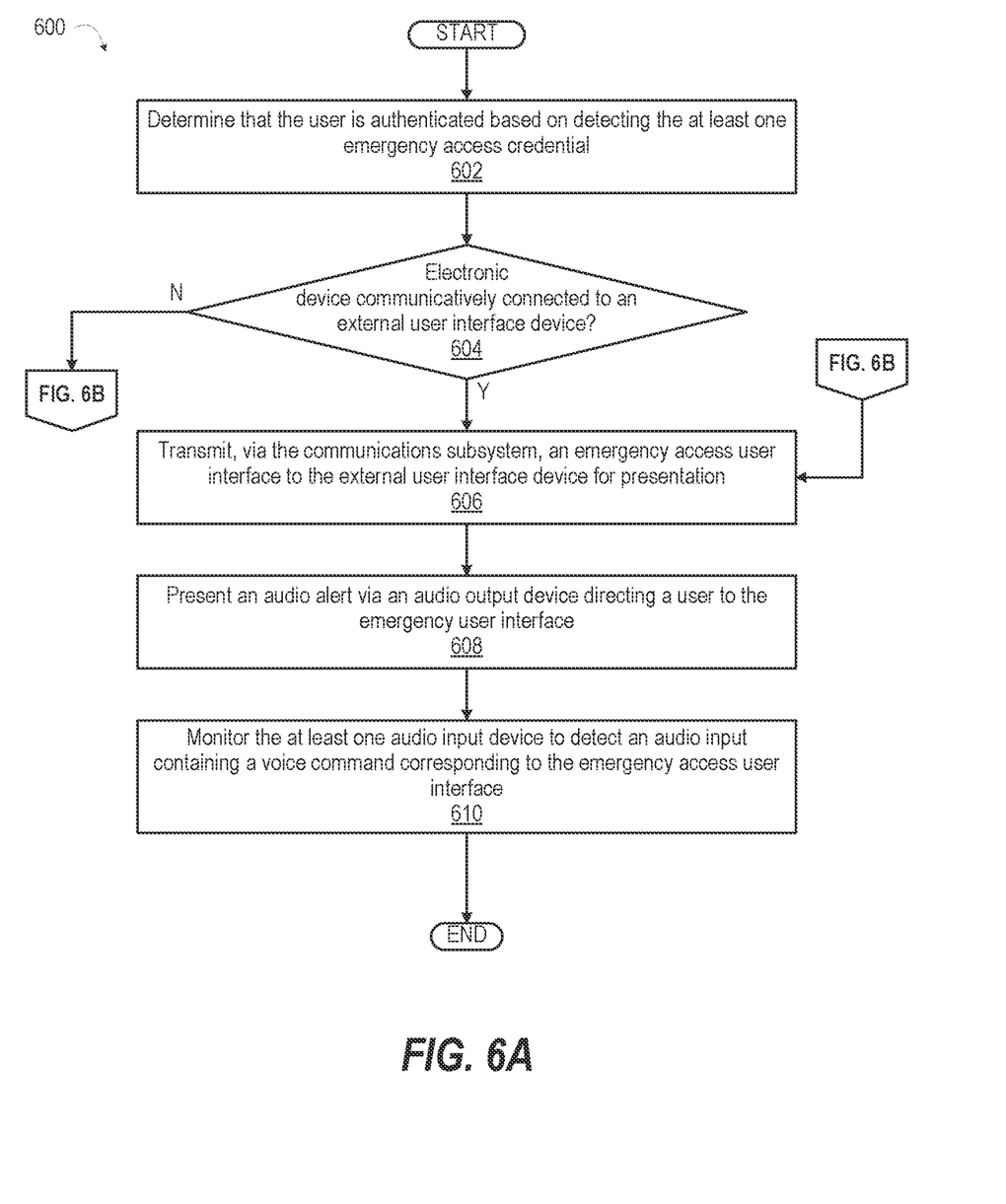
FIGS. 6A-6B (collectively "FIG. 6") are a flow diagram presenting a method of mitigating loss of operability of an integral touch screen display by presenting an emergency access user interface at an external user interface device, according to one or more embodiments.
Figure 6B:
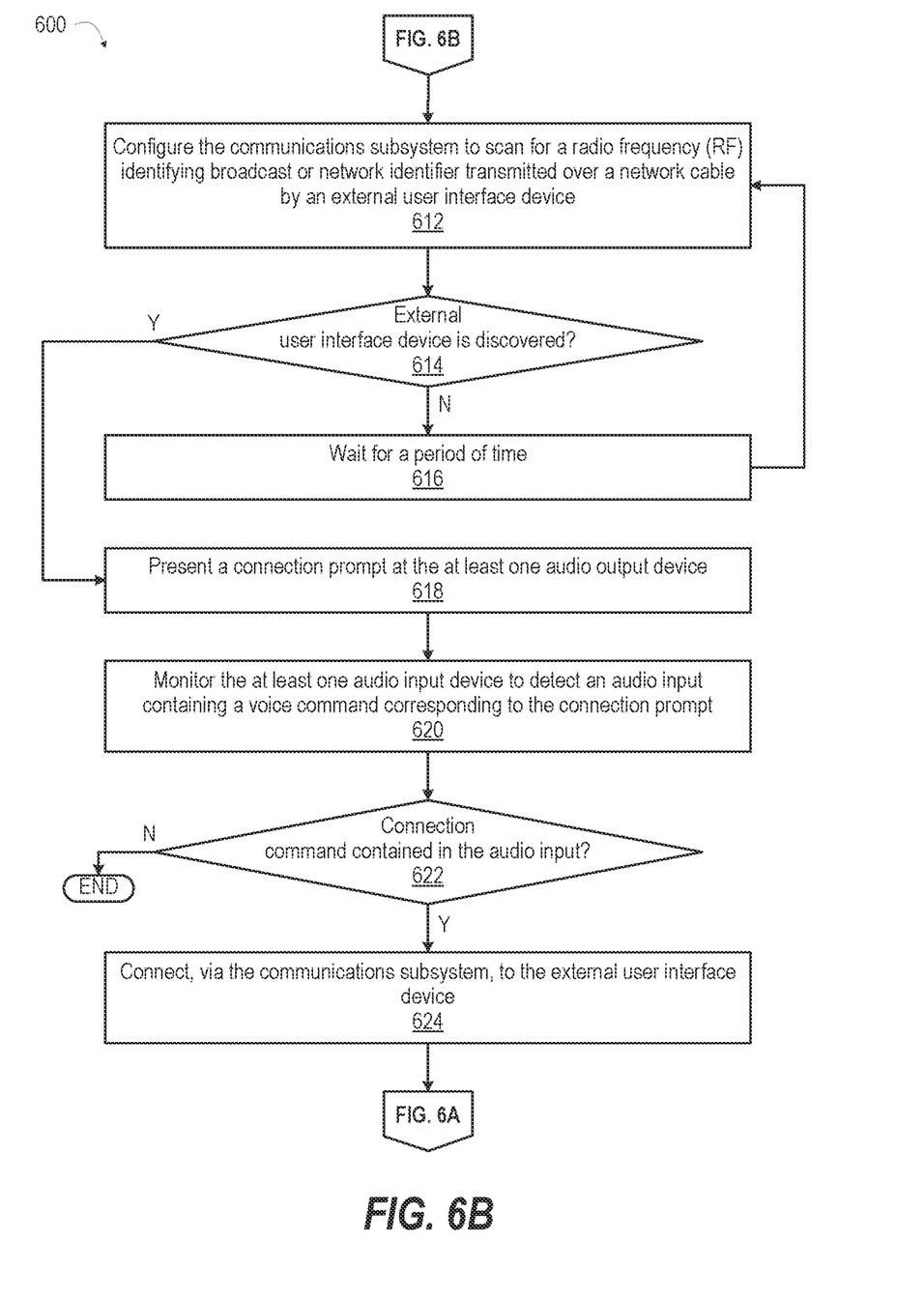

FIG. 4 is a flow diagram presenting method 400 of responding to the electronic device having an inoperable touch screen display by enabling emergency authentication of and access by a user by activating secondary authentication input options and data transfer features. FIG. 5 is a flow diagram presenting another example method 500 of responding to the electronic device having an inoperable touch screen display by enabling emergency authentication of and access by a user by activating secondary authentication input options and data transfer features. FIGS. 6A-6B (collectively "FIG. 6") are a flow diagram presenting method 600 of mitigating loss of operability of an integral touch screen display by presenting an emergency access user interface at an external user interface device. Method 600 may provide additionality functionality to either method 400 (FIG. 4) or method 500 (FIG. 5). The descriptions of method 4 (FIG. 4), method 500 (FIG. 5), and method 600 (FIG. 6) are provided with general reference to the specific components illustrated within the preceding FIGS. 1, 2, and 3. Specific components referenced in method 4 (FIG. 4), method 500 (FIG. 5), and method 600 (FIG. 6) may be identical or similar to components of the same name used in describing preceding FIGS. 1, 2, and 3. In one or more embodiments, controller 106 (FIG. 1) configures communication device 101 (FIGS. 1, 2, and 3) to provide the described functionality of method 400 (FIG. 4), method 500 (FIG. 5), and method 600 (FIG. 6).

With reference to FIG. 4, method 400 includes monitoring a touch screen display of an electronic device for operability (block 402). Method 400 includes determining whether the touch screen display is operable for presenting a user interface and detecting a touch input of a touch screen access credential (decision block 404). In response to determining that the touch screen display is operable, method 400 returns to block 402. In response to determining that the touch screen display is inoperable, method 400 includes accessing at least one emergency access credential (e.g., a face, a voice, a fingerprint, a gesture, and a spoken answer of private information) stored in memory of the electronic device and that does not involve a touch input at the touch screen display (block 406). Method 400 includes activating an emergency access mode and initiating monitoring at least one input device for an input of at least one emergency access credential (block 408). Method 400 includes determining whether an input is received (decision block 410). In response to not receiving an input, method 400 returns to block 408. In response to determining that an input is received, method 400 includes determining whether the at least one emergency access credential is detected (block 412). In response to determining that the at least one emergency access credential is not detected, method 400 returns to block 408. In response to determining that the at least one emergency access credential is detected, method 400 includes enabling one or more of detectable user inputs (e.g., gesture commands and voice commands) to control the electronic device (block 414). Then method 400 ends.

According to further aspects of the present disclosure, method 400 includes monitoring a touch screen display of an electronic device for operability. In response to determining at least a portion of the touch screen display is inoperable for one or more of presenting a user interface and detecting a touch input, method 400 includes accessing at least one emergency access credential stored in memory of the electronic device. Method 400 includes initiating monitoring at least one input device for an input of at least one emergency access credential without a touch input at the touch screen display. In response to authenticating a user based on detecting the at least one emergency access credential, method 400 includes enabling one or more detectable input commands (e.g., gesture and voice commands) to control the electronic device.

In one or more embodiments, the at least one input device includes at least one image capturing device. The at least one emergency access credential is a face of an authenticated user. In activating the emergency access mode and initiating monitoring the at least one input device for an input of the at least one emergency access credential, method 400 includes monitoring the at least one image capturing device to detect a facial image; and performing facial recognition on the detected facial image to identify whether the facial image is of the face of the authenticated user.

In one or more embodiments, the at least one input device includes at least one image capturing device, which may be located away from the touch screen. The at least one emergency access credential is a fingerprint of an authenticated user. In activating the emergency access mode and initiating monitoring the at least one input device for an input of the at least one emergency access credential, method 400 includes initiating monitoring of the at least one image capturing device to detect a fingerprint image. In response to detecting the fingerprint image, method 400 includes performing fingerprint recognition on the fingerprint image to identify whether the fingerprint image is of the fingerprint of the authenticated user.

In one or more embodiments, the at least one input device includes at least one audio input device. The at least one emergency access credential includes a voiceprint of an authenticated user. In activating the emergency access mode and initiating monitoring the at least one input device for an input of the at least one emergency access credential, method 400 includes initiating monitoring the at least one audio input device to detect an audio input. In response to detecting the audio input, method 400 includes performing voice recognition to identify the audio input contains the voiceprint of the authenticated user.

In one or more embodiments, in response to authenticating the user based on detecting the at least one emergency access credential, method 400 includes presenting at least one emergency access menu option via an audio output device of the electronic device. Method 400 includes monitoring the at least one audio input device to detect an audio input. Method 400 includes presenting an authentication prompt at the at least one audio output device. Method 400 includes comparing the audio input to the at least one emergency access credential by identifying one or more of a passcode, a password, personal identifying number, and a privately known answer contained in the audio input.

In one or more embodiments, in activating the emergency access mode and initiating monitoring the at least one input device for an input of the at least one emergency access credential, method 400 includes determining whether a second portion of the touch screen display is operable for partially presenting the user interface and detecting a touch input. In response to determining that the second portion of the touch screen display is operable as the at least one input device, method 400 includes rendering an emergency access user interface sized for and positioned within the second portion of the touch screen display. Method 400 includes monitoring the emergency access user interface for a touch input that matches the at least one emergency access credential.

In one or more embodiments, method 400 may include determining one or more input devices (e.g., microphones, image capturing devices, etc.) that are operable, such as an image capturing device or microphone. In an example, a front image capturing device incorporated into or positioned adjacent to the touch screen display may be damaged along with the touch screen display. A rear image capturing device may remain operable. For an image capturing device, method 400 may further include determining whether the field of focus of the image capturing device is positioned to capture a face or hands of an authenticated user. Method 400 may include presenting verbal instructions to position the electronic device so that an authenticated user may be captured by the field of focus of the image capturing device for providing gesture commands. In response to receiving one or more gesture commands or voice commands to backup at least selected computer data stored at the electronic device, method 400 includes connecting, via a communications subsystem of the electronic device and a communication network to a network device.

Aspects of the present disclosure adhere to concepts of data security including confidentiality, integrity, and availability. Confidentiality ensures that only authorized users, with appropriate credentials, have access to data. Integrity ensures that all data is accurate, trustworthy, and not prone to unjustified changes. Availability ensures that data is accessible and available for ongoing business or personal needs in a timely and secure manner. In particular, these concepts are implemented for mobile security. Mobile devices such as cell phones, tablets, computers and more have become a dominant part of our everyday lives. Mobile devices store information such as our contact list, passwords, emails, texts and so on. Mobile devices are set up to quickly access mobile banking services and social network hubs. Consequently, mobile security is important for information that needs to be protected from those that seek to access the information without receiving user permission. In addition, when partial failure of the mobile device occurs, users need an ability to backup, recover, or wipe some or all of the data stored on the mobile device.

According to aspects of the present disclosure, an emergency access mode (e.g., face, voice, fingerprint, gesture, and/or spoken answer of private information) is dynamically enabled when touch control failure is detected, and a user is authenticated in an alternate manner. In an example, in an electronic device, a voice tag and/or a face tag for a primary user of the electronic device is created and stored as an emergency device access mechanism. These biometric authentication data can be captured during out-of-box device setup or during device usage over period of time. Periodically, the electronic device performs a self-assessment with diagnostic self-tests for software and hardware health check. When the electronic device detects that a touch screen display has lost functionality, such as due to an accidental fall, water spills, or any hardware malfunction, the electronic device automatically enables emergency access mode of the device for the primary user. In an emergency access mode, both front and rear camera as well as all microphones of the electronic device can be made active and used for authenticating the user using voice/face tag. The electronic device subsequently uses face recognition of current facial image as compared to the face tag for emergency device access. Alternatively, or in addition, the electronic device subsequently uses voice recognition of a current audio input as compared to the voice tag for emergency device access.

In one or more embodiments, with the user authenticated, voice commands are accepted for emergency device access. With the user authenticated, voice commands may provide a user an ability to cast a device screen to a nearby device such as a laptop or desktop workstation having user interface devices such as a monitor, a keyboard, and a mouse. With the user authenticated, voice commands may provide a primary user an ability to access device data, upload the data to the cloud as a backup, and/or wipe the data from the device. With these capabilities, the electronic device can overcome loss of display functionality. In an example, the electronic device may automatically enable emergency access for the primary user by activating other device sensors to provide an emergency alternative to an inoperative touch screen display for user authentication and control. The control may be used to access, backup, or wipe private data to maintain data security.

With reference to FIG. 5, method 500 includes setting up device and activating owner profile setup (block 502). Method 500 includes collecting and storing user's emergency device unlock credentials (e.g., voice and voice tags) (block 504). Method 500 includes determining whether one or more of: (i) periodic triggers; (ii) device reboot; and (iii) fall detection has occurred (decision block 506). In response to determining that one or more of: (i) periodic triggers; (ii) device reboot; and (iii) fall detection has not occurred, method 500 includes determining normal operating mode for continuing use of device (block 508). Then method 500 returns to block 504.

In response to determining that one or more of: (i) periodic triggers; (ii) device reboot; and (iii) fall detection has occurred, method 500 includes performing software and hardware self-diagnostic checks of touch screen display (block 510). Method 500 includes determining whether the touch screen display is detected as having stopped working (decision block 512). In response to determining that the touch screen display is not detected as having stopped working, method 500 returns to block 508. In response to determining that the touch screen display is detected as having stopped working, method 500 includes enabling available emergency unlock methods as per the stored information (block 514). Method 500 includes prompting the user to unlock the device using emergency credentials (block 516). Method 500 includes enabling voice commands & accessibility mode to interact with the device using non-touch screen interfacing methods (block 518). Method 500 includes enabling user controls for data backup and data erasure (block 520). Then method 500 ends.

With reference to FIG. 6, method 600 includes determining that the user is authenticated based on detecting the at least one emergency access credential (block 602). Method 600 includes determining whether the electronic device is communicatively connected to an external user interface device configured to present a display output (decision block 604). In response to determining that the electronic device is communicatively connected to an external user interface device, method 600 includes transmitting, via the communications subsystem, an emergency access user interface to the external user interface device for presentation (block 606). In one or more embodiments, method 600 includes presenting an audio alert via an audio output device directing a user to the emergency user interface (block 608). Method 600 includes monitoring the at least one audio input device to detect an audio input containing a voice command corresponding to the emergency access user interface (block 610). Then method 600 ends. In response to determining that the electronic device is not communicatively connected to an external user interface device in decision block 604, method 600 proceeds to block 612 of FIG. 6B.

With reference to FIG. 6B, method 600 includes configuring the communications subsystem to scan for a radio frequency (IF) identifying broadcast or a network identifier transmitted over a network cable by an external user interface device (block 612). Method 600 includes determining whether an external user interface device is discovered (decision block 614). In response to determining that an external interface is not discovered, method 600 includes waiting for a period of time (block 616). Then method 600 returns to block 612. In response to determining that an external interface is discovered, method 600 includes presenting a connection prompt at the at least one audio output device (block 618). Method 600 includes monitoring the at least one audio input device to detect an audio input containing a voice command corresponding to the connection prompt (block 620). Method 600 includes determining whether a connection command is contained in the audio input (decision block 622). In response to detecting a connection command contained in the audio input, method 600 includes connecting, via the communications subsystem, to the external user interface device (block 624). Then method 600 returns to block 606 (FIG. 6A). In response to not detecting a connection command contained in the audio input, method 600 ends.

According to aspects of the present disclosure, in response to authenticating the user based on detecting the at least one emergency access credential, method 600 may include presenting a connection prompt at the at least one audio output device in response to determining that the electronic device is communicatively connected or connectable to an external user interface device configured to present a display output. Method 600 may include monitoring the at least one audio input device to detect an audio input. Method 600 may include transmitting, via the communications subsystem, an emergency access user interface to the external user interface device for presentation in response to detecting a connection command contained in the audio input.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a touch screen display;
   at least one input device that is not the touch screen display;
   a memory storing a touch screen access credential for normal login access to the electronic device via the touch screen display and at least one emergency access credential that provides an alternative way to the normal login access for authenticated emergency access to and control of the communication device when the normal login access is not available due to a detected failure of the touch screen display; and
   a controller communicatively connected to the touch screen display, the at least one input device, and the memory, and which:
   monitors the touch screen display for operability; and
   in response to determining at least a portion of the touch screen display is inoperable for one or more of presenting a user interface and detecting a touch input to enable the normal login access to and use of the electronic device via a touch screen access credential:
      automatically activates an emergency access mode, which initiates monitoring of the at least one input device for an input of the at least one emergency access credential; and
      in response to authenticating a user based on detecting input of the at least one emergency access credential during the emergency access mode, enables one or more detectable input commands received via the at least one input device to control the electronic device.

2. The electronic device of claim 1, wherein:
   the at least one input device comprises at least one image capturing device;
   the at least one emergency access credential is a face of an authenticated user; and
   in activating the emergency access mode and initiating monitoring of the at least one input device for an input of the at least one emergency access credential, the controller:

monitors the at least one image capturing device to detect a facial image; and performs facial recognition on a detected facial image to identify whether the facial image is of the face of the authenticated user.

3. The electronic device of claim 1, wherein:

the at least one input device comprises at least one image capturing device;

the at least one emergency access credential is a fingerprint of an authenticated user; and in activating the emergency access mode and initiating monitoring the at least one input device for an input of the at least one emergency access credential, the controller:

initiates monitoring of the at least one image capturing device to detect a fingerprint image; and in response to detecting the fingerprint image, performs fingerprint recognition on the fingerprint image to identify whether the fingerprint image is of the fingerprint of the authenticated user.

4. The electronic device of claim 1, wherein:

the at least one input device comprises at least one audio input device; and the at least one emergency access credential comprises a voiceprint of an authenticated user; and in activating the emergency access mode and initiating monitoring the at least one input device for an input of the at least one emergency access credential, the controller:

initiates monitoring of the at least one audio input device to detect an audio input; and in response to detecting the audio input, performs voice recognition to identify whether the audio input contains the voiceprint of the authenticated user.

5. The electronic device of claim 1, further comprising an audio output device communicatively connected to the controller, wherein, in response to authenticating the user based on detecting the at least one emergency access credential, the controller presents at least one emergency access menu option via the audio output device.

6. The electronic device of claim 5, wherein the at least one input device comprises at least one audio input device, and the controller:

monitors the at least one audio input device to detect audio input;

presents an authentication prompt at the at least one audio output device; and compares the audio input to the at least one emergency access credential by identifying one or more of a passcode, a password, personal identifying number, and a privately known answer contained in the audio input.

7. The electronic device of claim 1, wherein, in activating the emergency access mode and initiating monitoring of the at least one input device for an input of the at least one emergency access credential, the controller:

determines whether a second portion of the touch screen display is operable for partially presenting the user interface and detecting a touch input;

in response to determining that the second portion of the touch screen display is operable as the at least one input device, renders an emergency access user interface sized for and positioned within the second portion of the touch screen display; and monitors the emergency access user interface for a touch input that matches the at least one emergency access credential.

8. The electronic device of claim 1, further comprising a communications subsystem communicatively connected to the controller, wherein:

the memory contains computer data; and in response to receiving one or more gesture commands or voice commands to backup selected computer data, the controller:

connects, via the communications subsystem and a communication network to a network device; and uploads the selected computer data to the network device.

9. The electronic device of claim 8, wherein the communication network comprises at least one of a personal access network (PAN), a wireless local area network (WLAN), a radio access network (RAN), and a personal internet of things network (PIN).

10. The electronic device of claim 1, further comprising a communications subsystem and an audio output device both communicatively connected to the controller, wherein:

the at least one input device comprises at least one audio input device; and in response to authenticating the user based on detecting the at least one emergency access credential, the controller:

presents a connection prompt at the at least one audio output device in response to determining that the electronic device is communicatively connected or connectable to an external user interface device configured to present a display output;

monitors the at least one audio input device to detect an audio input; and transmits, via the communications subsystem, an emergency access user interface to the external user interface device for presentation in response to detecting a connection command contained in the audio input.

11. A method comprising:

monitoring a touch screen display of an electronic device for operability, the electronic device configured with at least one input device separate from the touch screen display; and in response to determining at least a portion of the touch screen display is inoperable for one or more of presenting a user interface and detecting a touch input to enable login access via a touch screen access credential that is a normal login access to the electronic device:

accessing at least one emergency access credential stored in memory of the electronic device that provides an alternative way to the normal login access for authenticated emergency access to and control of the communication device when the normal login access is not available due to a detected failure of the touch screen display;

automatically activating an emergency access mode, which initiates monitoring of at least one input device for an input of at least one emergency access credential; and in response to authenticating a user based on detecting input of the at least one emergency access credential during the emergency access mode, enabling one or more detectable input commands received via the at least one input device to control the electronic device.

12. The method of claim 11, wherein:

the at least one input device comprises at least one image capturing device;

the at least one emergency access credential is a face of an authenticated user; and in activating the emergency access mode and initiating monitoring of the at least one input device for an input of the at least one emergency access credential, the method comprises:

monitoring the at least one image capturing device to detect a facial image; and performing facial recognition on a detected facial image to identify whether the facial image is of the face of the authenticated user.

13. The method of claim 11, wherein:

the at least one input device comprises at least one image capturing device;

the at least one emergency access credential is a fingerprint of an authenticated user; and in activating the emergency access mode and initiating monitoring the at least one input device for an input of the at least one emergency access credential, the method comprises:

initiating monitoring of the at least one image capturing device to detect a fingerprint image; and in response to detecting the fingerprint image, performing fingerprint recognition on the fingerprint image to identify whether the fingerprint image is of the fingerprint of the authenticated user.

14. The method of claim 11, wherein:

the at least one input device comprises at least one audio input device; and the at least one emergency access credential comprises a voiceprint of an authenticated user; and activating the emergency access mode and initiating monitoring the at least one input device for an input of the at least one emergency access credential comprises:

initiating monitoring of the at least one audio input device to detect an audio input; and in response to detecting the audio input, performing voice recognition to identify whether the audio input contains the voiceprint of the authenticated user.

15. The method of claim 11, wherein, in response to authenticating the user based on detecting the at least one emergency access credential, the method comprises presenting at least one emergency access menu option via an audio output device of the electronic device.

16. The method of claim 15, wherein the at least one input device comprises at least one audio input device, and the method comprises:

monitoring the at least one audio input device to detect audio input;

presenting an authentication prompt at the at least one audio output device; and comparing the audio input to the at least one emergency access credential by identifying one or more of a passcode, a password, personal identifying number, and a privately known answer contained in the audio input.

17. The method of claim 11, wherein activating the emergency access mode and initiating monitoring of the at least one input device for an input of the at least one emergency access credential comprises:

determining whether a second portion of the touch screen display is operable for partially presenting the user interface and detecting a touch input;

in response to determining that the second portion of the touch screen display is operable as the at least one input device, rendering an emergency access user interface sized for and positioned within the second portion of the touch screen display; and monitoring the emergency access user interface for a touch input that matches the at least one emergency access credential.

18. The method of claim 11, further comprising:

in response to receiving one or more gesture commands or voice commands to backup selected computer data stored at the electronic device, the method comprises:

connecting, via a communications subsystem of the electronic device and a communication network to a network device; and uploading the at least selected computer data to the network device.

19. The method of claim 11, further comprising:

in response to authenticating the user based on detecting the at least one emergency access credential:

presenting a connection prompt at one or more audio output devices in response to determining that the electronic device is communicatively connected or connectable to an external user interface device configured to present a display output;

monitoring at least one audio input device to detect an audio input; and transmitting, via a communications subsystem of the electronic device, an emergency access user interface to the external user interface device for presentation in response to detecting a connection command contained in the audio input.

20. A computer program product comprising:

a non-transitory computer readable storage device; and program code on the computer readable storage device that when executed by a processor associated with an electronic device, the program code enables the electronic device to provide functionality of:

monitoring a touch screen display of the electronic device for operability, the electronic device configured with at least one input device separate from the touch screen display; and in response to determining at least a portion of the touch screen display is inoperable for one or more of presenting a user interface and detecting a touch input to enable login access via a touch screen access credential that is a normal login access to the electronic device:

accessing at least one emergency access credential stored in memory of the electronic device that provides an alternative way to the normal login access for authenticated emergency access to and control of the communication device when the normal login access is not available due to a detected failure of the touch screen display;

automatically activating an emergency access mode, which initiates monitoring of at least one input device for an input of at least one emergency access credential; and in response to authenticating a user based on detecting input of the at least one emergency access credential during the emergency access mode, enabling one or more detectable input commands received via the at least one input device to control the electronic device.

* * * * *